(12) United States Patent
Chen et al.

(10) Patent No.: US 11,900,643 B2
(45) Date of Patent: Feb. 13, 2024

(54) OBJECT DETECTION METHOD AND OBJECT DETECTION SYSTEM

(71) Applicant: HIMAX TECHNOLOGIES LIMITED, Tainan (TW)

(72) Inventors: I-Wei Chen, Tainan (TW); Ta-Jen Kuo, Tainan (TW); Pin-Rong Chen, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 285 days.

(21) Appl. No.: 17/477,557

(22) Filed: Sep. 17, 2021

(65) Prior Publication Data

US 2023/0091892 A1 Mar. 23, 2023

(51) Int. Cl.
| | |
|---|---|
| *G06V 10/22* | (2022.01) |
| *G06T 7/20* | (2017.01) |
| *G06T 3/40* | (2006.01) |
| *G06V 10/25* | (2022.01) |
| *G06V 10/44* | (2022.01) |
| *G06V 40/10* | (2022.01) |

(52) U.S. Cl.
CPC ............... *G06V 10/22* (2022.01); *G06T 3/40* (2013.01); *G06T 7/20* (2013.01); *G06V 10/25* (2022.01); *G06V 10/443* (2022.01); *G06V 10/457* (2022.01); *G06V 40/10* (2022.01); G06T 2207/20084 (2013.01); G06T 2207/30196 (2013.01)

(58) Field of Classification Search
CPC ........ G06V 10/22; G06V 10/25; G06V 10/44; G06V 10/443; G06V 10/457; G06V 40/10; G06V 10/46; G06V 10/26; G06V 10/478; G06V 10/82; G06V 2201/07; G06T 3/40; G06T 7/20; G06T 2207/20084; G06T 2207/30196
See application file for complete search history.

(56) References Cited

U.S. PATENT DOCUMENTS

| | | | | |
|---|---|---|---|---|
| 8,737,758 | B2* | 5/2014 | Kim | G06T 5/002 |
| | | | | 382/265 |
| 9,275,308 | B2* | 3/2016 | Szegedy | G06V 10/454 |
| 11,087,163 | B2* | 8/2021 | Goodman | G06V 10/82 |
| 11,182,636 | B2* | 11/2021 | Chen | G06T 7/11 |
| 11,393,253 | B1* | 7/2022 | Maron | G06V 10/25 |
| 11,594,009 | B2* | 2/2023 | Tarashima | G06V 20/30 |

FOREIGN PATENT DOCUMENTS

| | | |
|---|---|---|
| CN | 106599939 A | 4/2017 |
| CN | 108648233 A | 10/2018 |
| CN | 111160249 A | 5/2020 |
| TW | 202101377 A | 1/2021 |

OTHER PUBLICATIONS

Wang, Hongzhen, et al. "Objectness estimation using edges." 2015 IEEE International Conference on Image Processing (ICIP). IEEE, 2015. (Year: 2015).*

* cited by examiner

*Primary Examiner* — Edward F Urban
*Assistant Examiner* — Benedict E Lee
(74) *Attorney, Agent, or Firm* — Winston Hsu

(57) ABSTRACT

An object detection method, for detecting a target object, comprising: capturing at least two detection portions with a first aspect ratio from an input image with a second aspect ratio; confirming whether any object is detected in each of the detection portions and obtaining corresponding boundary boxes for detected objects; and wherein the first aspect ratio is different to the second aspect ratio.

14 Claims, 10 Drawing Sheets

OBJECT DETECTION METHOD AND OBJECT DETECTION SYSTEM

BACKGROUND OF THE INVENTION

1. Field of the Invention

The present invention relates to an object detection method and an object detection system, and particularly relates to an object detection method and an object detection system which can more accurately detect a target object such as a person, an animal, or a vehicle.

2. Description of the Prior Art

In recent years, person detection tech becomes more and more popular. For example, a security camera may use person detection to detect if any person is close, to generate an informing message accordingly. For another example, a camera may use person detection to help focus, to increase the clarity of a picture.

However, when a person image of a person is relatively small in a whole image captured by the camera, it is hard to detect the existence of the person. Prior art may enlarge a possible person image to check if it is really a person image. However, such tech may need a large buffer for image computation.

Also, in a conventional person detection method, the input image and the image for person detection may have different sizes and different aspect ratios. Therefore, a conventional person detection method may scale the whole input image to meet the size and the aspect ratio of the image for person detection. However, the scaled input image may have some blank areas due to the differences between the aspect ratios of the input image and the image for person detection.

For example, as shown in FIG. 1, the input image 100 is an 640×480 image, and a length of the scaled input image 103 (the image for person detection is 224. Therefore, the width of the scaled input image 103 becomes $$\frac{224}{640} \times 480 = 168.$$

Accordingly, the scaled input image 103 has blank region BR having a total width of 224−168=56 pixels. In such case, a size of the person image 101 in the scaled input image 103 is reduced, thus is harder to be detected. Therefore, the accuracy for person detection is decreased.

SUMMARY OF THE INVENTION

One objective of the present invention is to provide an object detection method which can accurately detect persons without increasing a size of the buffer.

Another objective of the present invention is to provide an object detection system which can accurately detect persons without increasing a size of the buffer.

One embodiment of the present invention discloses an object detection method, for detecting a target object, comprising: capturing at least two detection portions with a first aspect ratio from an input image with a second aspect ratio; confirming whether any object is detected in each of the detection portions and obtaining corresponding boundary boxes for detected objects; and wherein the first aspect ratio is different to the second aspect ratio.

Another embodiment of the present invention discloses an object detection system, for detecting a target object, comprising: a partial image capturing device, configured to capture at least two detection portions with a first aspect ratio from an input image with a second aspect ratio; and an object detector, configured to confirm whether any object is detected in each of the detection portions and to obtain corresponding boundary boxes for detected objects. The first aspect ratio is different to the second aspect ratio.

In view of above-mentioned embodiments, the detection of persons can be more accurate without increasing a size of the buffer.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Furthermore, in following embodiments, the target object which is desired to be detected is a person, but the target object can be any other object such as a specific animal or a vehicle. Additionally, the following embodiments can be provided to an image capturing device such as a camera, but can be any other device as well.

Figure 2:
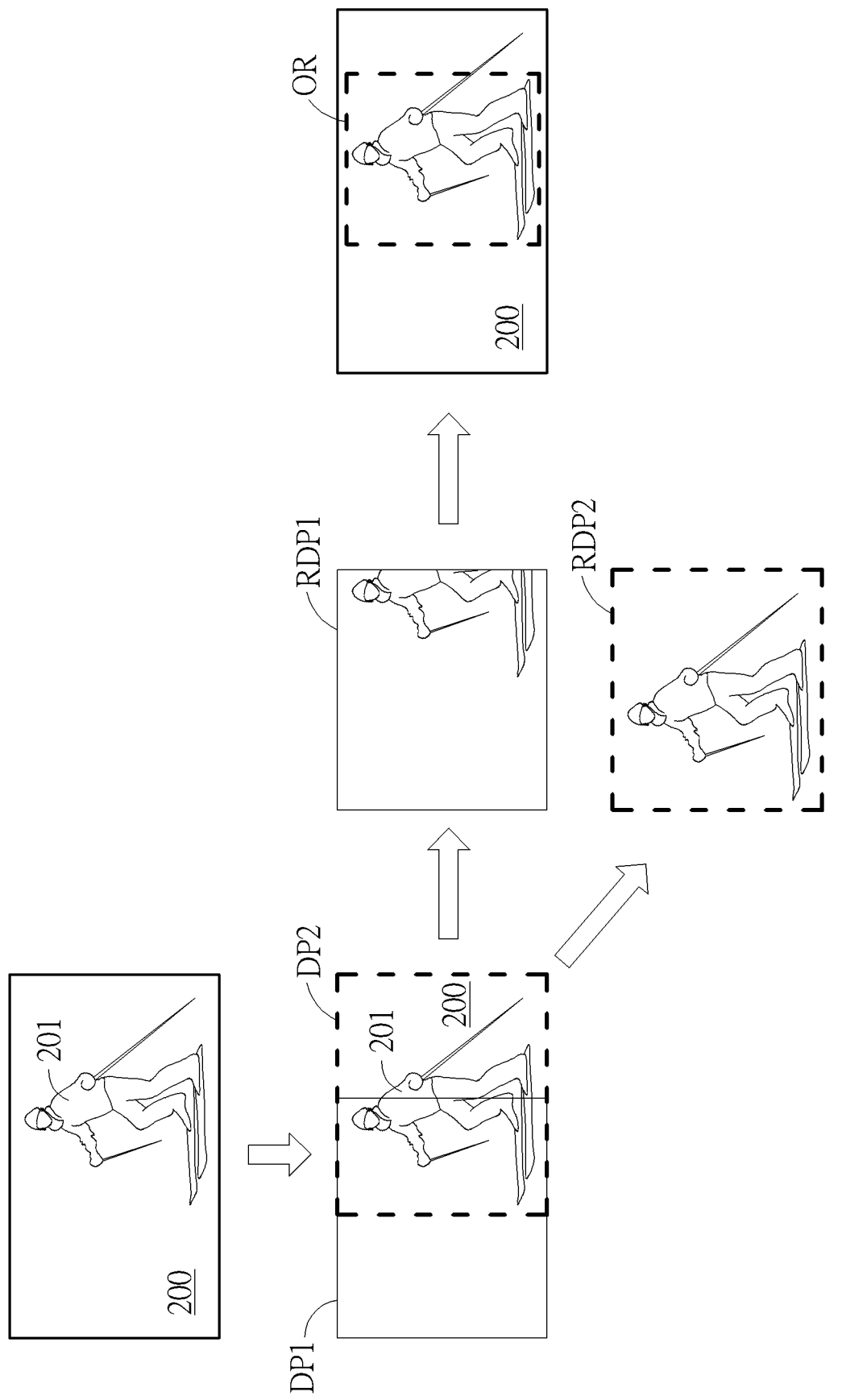
FIG. 2 is a schematic diagram illustrating an object detection method, according to one embodiment of the present invention.

FIG. 2 is a schematic diagram illustrating an object detection method, according to one embodiment of the present invention. Such method can also be named as a 2-crop method. As shown in FIG. 2, an input image 200 with a first aspect ratio is received, which comprises a target object image 201 of the target object. The input image can be an image captured by a camera or comes from any other source. Afterwards, a first detection portion DP1 of the input image 200 is resized to generate a first resized detection portion RDP1. The first detection portion DP1 comprises at least first portion of the target object image 201. Afterwards, the first resized detection portion RDP1 is buffered to a buffer. Also, the first coordinates of the first portion of the target object image 201 are computed according to the first resized detection portion RDP1 in the buffer and a target object detection. Many methods can be applied to compute the first coordinates of the first portion of the target object image 201. For example, the image comprising specific edges or specific features can be regarded as the target object image 201, thus the coordinates thereof can be recorded.

Further, after the first coordinates are computed and recorded, the first resized detection portion DP1 is removed from the buffer. A second detection portion DP2 of the input image 200 is resized to generate a second resized detection portion RDP2. The second detection portion DP2 comprises at least second portion of the target object image 201. Please note, the generation of the second resized detection portion RDP2 is not limited be performed after the first coordinates are computed. At least part of the first portion is identical with the second portion, as illustrated in FIG. 2.

After the first resized detection portion RDP1 is removed from the buffer, buffering the second resized detection portion RDP2 to the buffer. Then, computing second coordinates of the second portion of the target object image 201 according to the second resized detection portion RDP2 in the buffer. After the first coordinates and the second coordinates are acquired. Computing an object range of the target object image 201 according to the first coordinates and the second coordinates. The first/second detection portion DP1/DP2 and the first/second resized detection portion RDP1/RDP2 are second aspect ratio, which matches the input of the target object detection. In this way, it prevents from over shrinking the target object. In another input image case, the detection portions DP1 and DP2 may not both comprises at least portion of the target object image 201.

In one embodiment, the first detection portion DP1 and the second detection portion DP2 are first squares. Additionally, the first resized detection portion RDP1 and the second resized detection portion RDP2 are second squares smaller than the first squares. Further, in one embodiment a width and a length of the first resized detection portion RDP1 and the second resized detection portion RDP2 are less than half of which of the first detection portion DP1 and the second detection portion DP2.

For example, in one embodiment, the input image 200 is an 640×480 image. Also, the first detection portion DP1 and the second detection portion DP2 are 480×480 images. Besides, the first resized detection portion RDP1 and the second resized detection portion RDP2 are 224×224 images. However, the sizes of the first detection portion DP1, the second detection portion DP2, the first resized detection portion RDP1 and the second resized detection portion RDP2 are not limited to these examples.

In the above-mentioned example, the aspect ratio of the input image 200 (640/480) is different to which of the detection portions DP1 and DP2 (480/480). Also, aspect ratios of the detection portions DP1 and DP2 (480/480) and the resized detection portions RDP1 and RDP2 (224/224) are the same.

Besides, the above-mentioned object range which is computed based on first coordinates and the second coordinates can be a boundary box shown in FIG. 2, but not limited. The object range can be any shape. Such boundary box contains a portion of the target object image 201 but can also contain other portions of the input image 200. Coordinates of the object range can be recorded. Or, in one embodiment, the image which is marked by the object ranges is displayed.

Please note, in the embodiment of FIG. 2, the detection portions DP1 and DP2 are resized to generate the resized detection portions RDP1 and RDP2, which are used for matching the input requirement of objection detection. However, in one embodiment, the detection portions DP1 and DP2 are not resized and directly used for objection detection, if the size matches the input requirement of objection detection.

Figure 3:
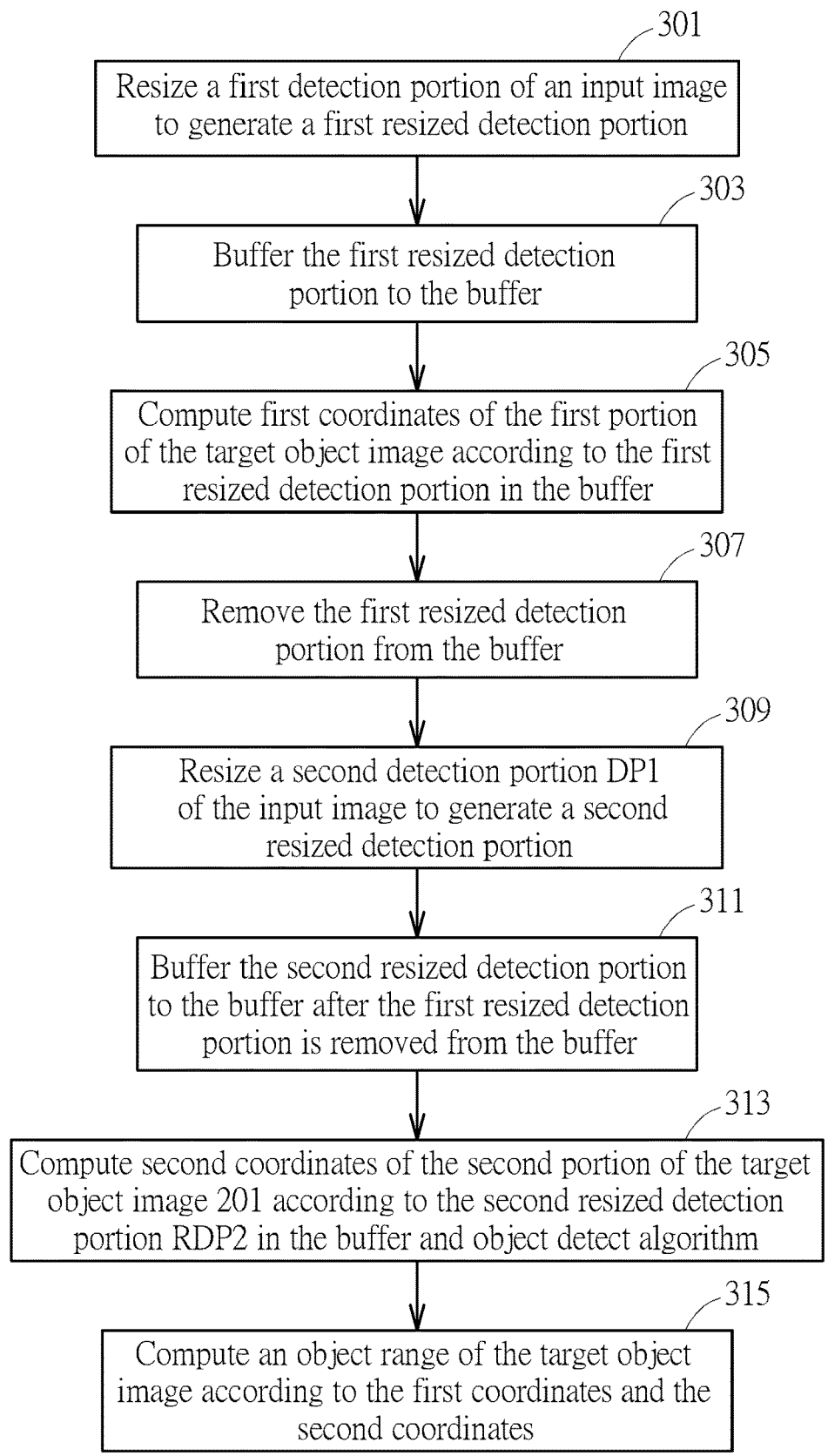
FIG. 3 is a flow chart corresponding to the object detection method illustrated in FIG. 2.

The above-mentioned object detection can be summarized as FIG. 3, which illustrates a flow chart corresponding to the object detection method illustrated in FIG. 2. FIG. 3 comprises following steps:

Step 301

Resize a first detection portion DP1 of an input image 200 to generate a first resized detection portion RDP1. The first detection portion DP1 comprises at least first portion of a target object image 201 of the target object.

The target object can be a person, an animal, a vehicle, or any other object is desired to be detected.

Step 303

Buffer the first resized detection portion RDP1 to the buffer.

Step 305

Compute first coordinates of the first portion of the target object image 201 according to the first resized detection portion RDP1 in the buffer.

Step 307

Remove the first resized detection portion RDP1 from the buffer.

Step 309

Resize a second detection portion DP1 of the input image 200 to generate a second resized detection portion RDP2. The second detection portion RDP2 comprises at least second portion of the target object image 201.

Step 311

Buffer the second resized detection portion RDP2 to the buffer after the first resized detection portion RDP1 is removed from the buffer.

Step 313

Compute second coordinates of the second portion of the target object image 201 according to the second resized detection portion RDP2 in the buffer and object detect algorithm.

Step 315

Compute an object range of the target object image 201 according to the first coordinates and the second coordinates.

Please note, the sequence of the object detection method corresponding to the embodiment of FIG. 2 is not limited to be the sequence illustrated in FIG. 3.

Figure 1:
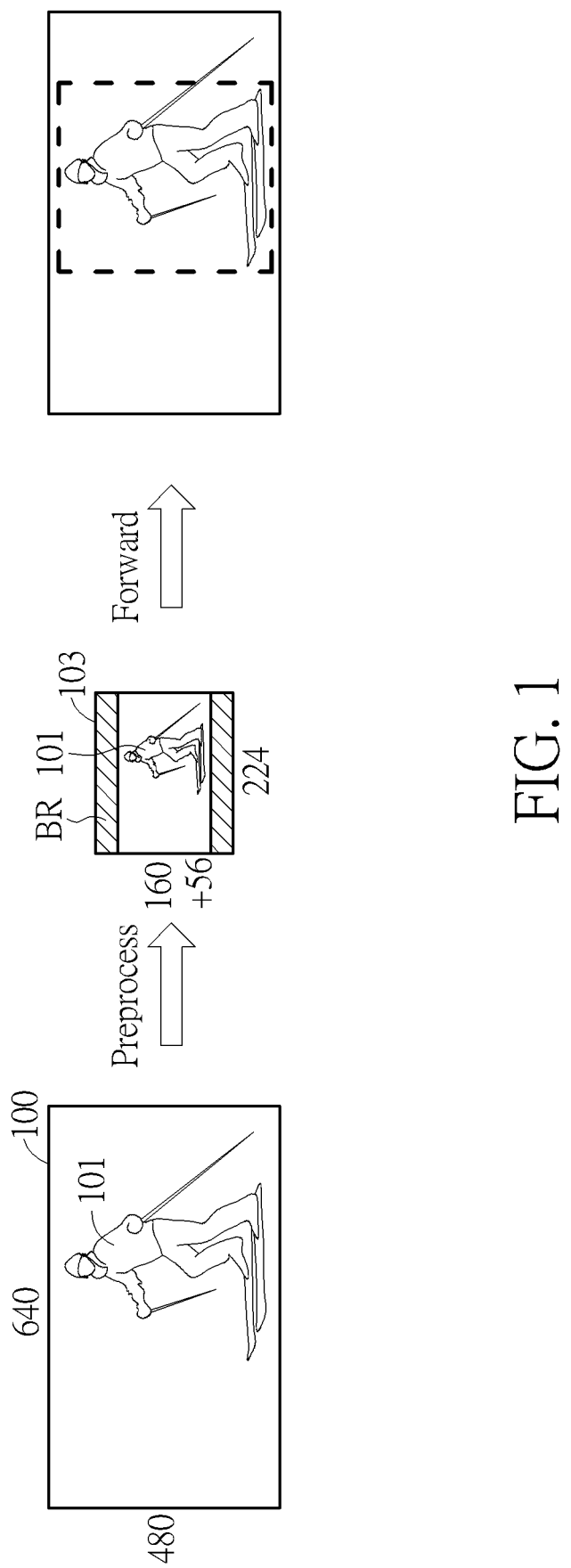
FIG. 1 is a schematic diagram illustrating a conventional person detection method.

Compared with prior art, a size of the buffer can be reduced since the input image 200 is processed based on two smaller images. Also, the resized images RDP1 and RDP2 do not have blank regions as shown in FIG. 1, thus the size of the target object image 201 is not reduced. Accordingly, the object detection method illustrated in FIG. 2 can enlarge the target object image 201, thus the target object is more easily to be detected.

In one embodiment, a ROI (region of interest) is provided in the input image to compute motions of the target objects in the ROI. However, if some objects are wrongly determined as the target object, the ROI may be too large. Under such case, the power consumption is high and the motion computation may be non-accurate. The object detection method illustrated in FIG. 2 can be applied to improve such issue.

Figure 4:
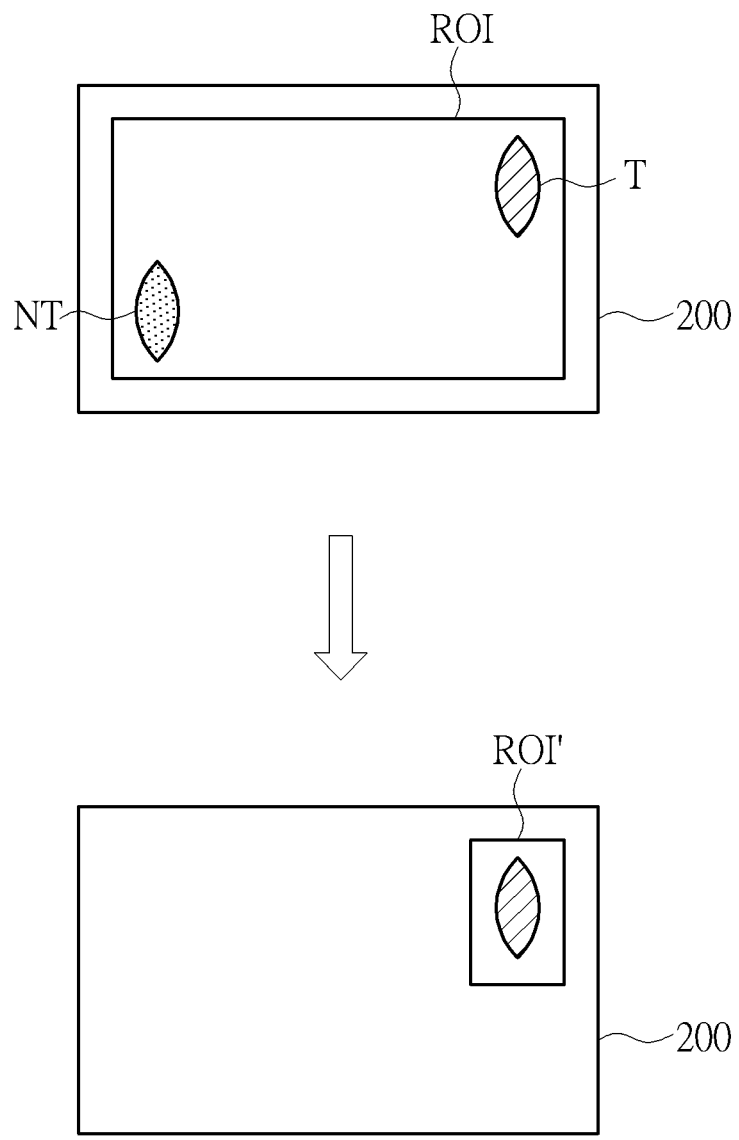
FIG. 4 is a schematic diagram illustrating an example that the object range is applied to help define a ROI.

As illustrated in the upper drawing in FIG. 4, the ROI contains a target object T and another object NT which is not a target object. In such case, the object detection method illustrated in FIG. 2 can be applied to define the object range of the target object T. Therefore, no object range of the object NT will be acquired by the object detection method illustrated in FIG. 2, thus it can be removed from the ROI. Accordingly, the ROI is adjusted to a smaller ROI', which only contains the target object T. In some cases, the ROI can be adjusted to a larger one, if necessary. Please note, in the embodiment illustrated in FIG. 4, a ROI is provided first and then is adjusted to ROI' by the object detection method illustrated in FIG. 2. However, in another embodiment, the object detection method illustrated in FIG. 2 can be performed without any ROI be provided, then a ROI can be set according to the object range computed by the object detection method illustrated in FIG. 2.

Via the embodiment illustrated in FIG. 4, the ROI can be adjusted or set to a more proper size. In one embodiment, the object detection method illustrated in FIG. 2 is performed when the ROI is larger than a ROI threshold area and is not performed when the ROI is smaller than the ROI threshold area, since a small ROI may contain less unneeded objects. The ROI and the motion detection can be performed by various methods. For example, the US patent application with an application Ser. No. 17/079,255 disclose such methods.

Following the embodiments illustrated in FIG. 2, a plurality of object ranges may be acquired. However, some object ranges may overlap with other object ranges, thus reduces the accuracy of object detection. Therefore, in following embodiments, some methods are provided to remove unneeded object ranges. In following embodiments, the object ranges are the above-mentioned boundary boxes, but not limited.

Figure 5:
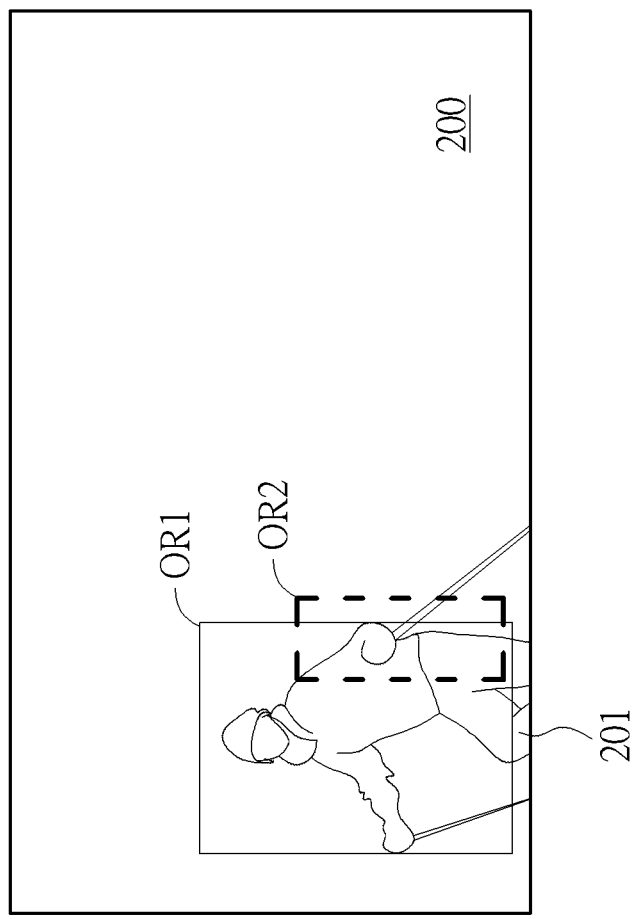
FIG. 5, and FIG. 6 are schematic diagrams illustrating an object detection method, according to another embodiment of the present invention.

As shown in FIG. 5, a first object range OR1 and a second object range OR2 corresponding to the target object image 201 are provided. The first object range OR1 and the second object range OR2 respectively correspond to at least one portion of the target object image 201. Please note, the first object range OR1 and the second object range OR2 can be acquired by the object detection method illustrated in FIG. 2, but can be acquired by other methods as well.

Figure 6:
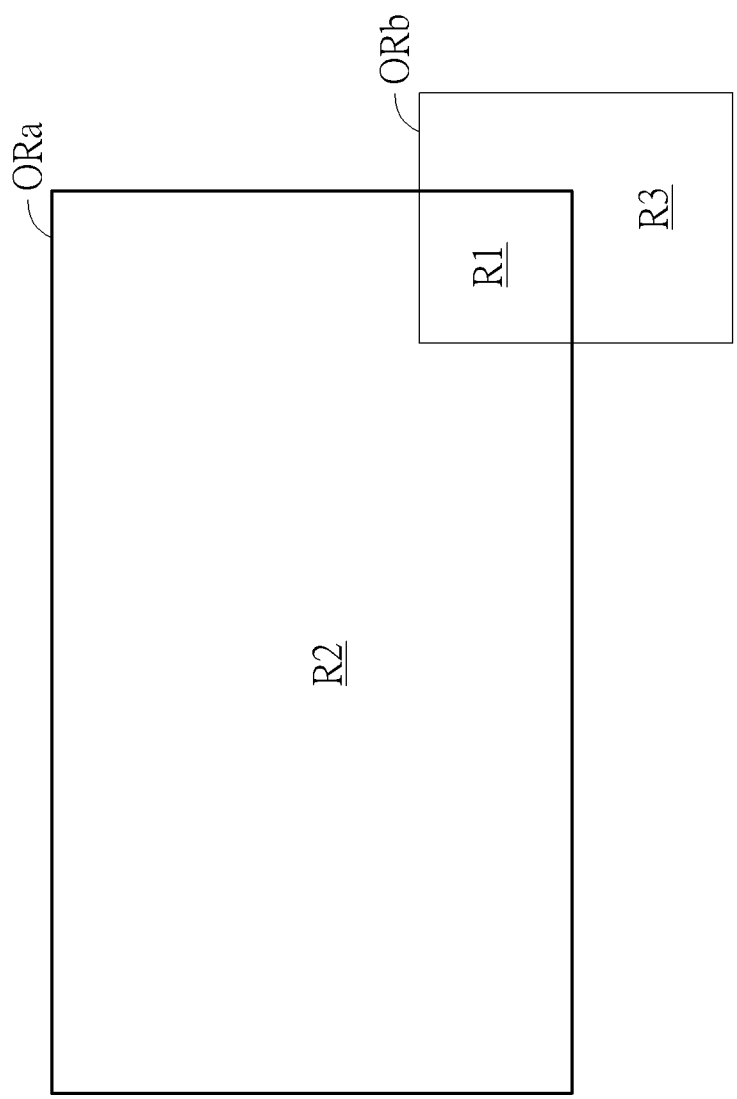

Also, the intersection region of the first object range OR1 and the second object range OR2 is computed. Besides, the union region of the first object range OR1 and the second object range OR2 is also computed. The definitions of the intersection region and the union region are illustrated in FIG. 6. In FIG. 6, the object range ORa comprises regions R1 and R2, and the object range ORb comprises regions R1 and R3. The intersection region of object ranges ORa and Orb is R1, and the union region of object ranges ORa and Orb is R1+R2+R3. In other words, the intersection region means an overlapped region, and the union region means all range covered by the object ranges ORa and Orb.

After the intersection region and the union region are acquired, the first object range Or1 or the second objection range Or2 is removed according to a relation between an area of the intersection region and an area of the union region. In one embodiment, a smaller one of the first object range OR1 and the second objection range OR2 is removed if $$\frac{AI}{AU}$$

is larger than a first threshold value. AI is the area of the intersection region and AU is the area of the union region.

Figure 7:
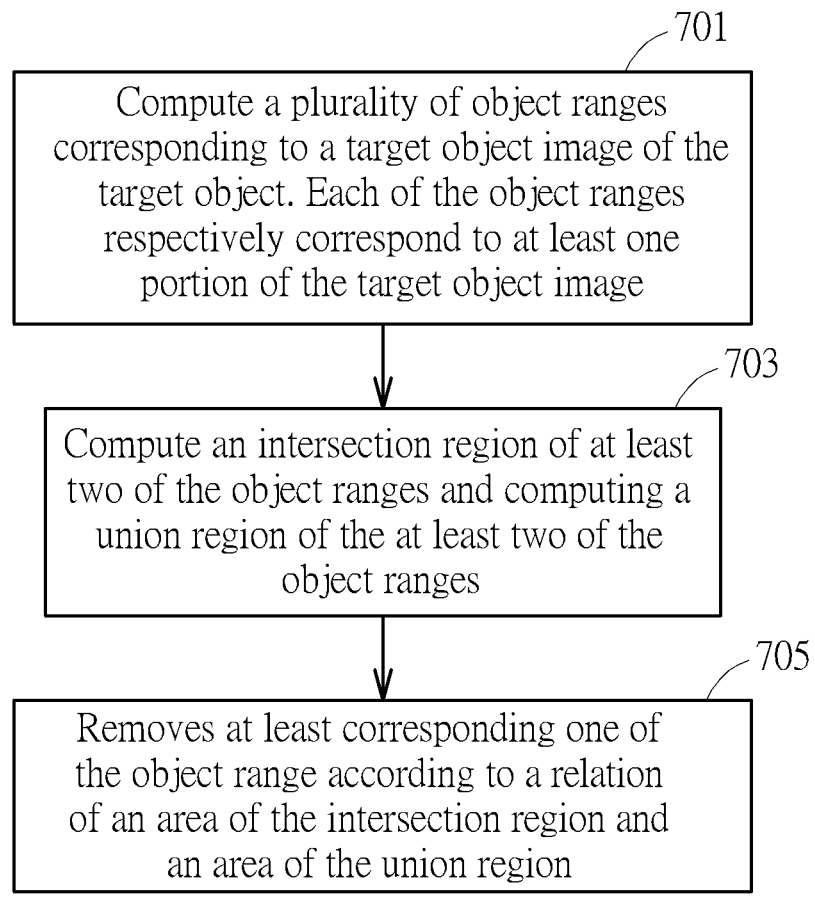
FIG. 7 is a flow chart illustrating a flow chart of the object detection method illustrated in FIG. 5, FIG. 6.

The steps illustrated in FIG. 5 and FIG. 6 can be repeated until all object ranges have been processed. Please note, although the embodiments illustrated in FIG. 5 and FIG. 6 use two object ranges as an example. The concept disclosed in FIG. 5 and FIG. 6 can be used for more than two objects. Therefore, an object detection method illustrated in FIG. 5 and FIG. 6 can be summarized as the steps show in FIG. 7:

Step 701

Compute a plurality of object ranges corresponding to a target object image of the target object. Each of the object ranges respectively correspond to at least one portion of the target object image.

The object range can be acquired by the object detection method illustrated in FIG. 2, but can also be acquired by any other method as well.

Step 703

Compute an intersection region of at least two of the object ranges and computing a union region of the at least two of the object ranges.

Step 705

Removes at least corresponding one of the object range according to a relation of an area of the intersection region and an area of the union region.

In one embodiment, the step 705 removes at least corresponding one of the object range if $$\frac{AI}{AU}$$

is larger than a first threshold value. AI is the area of the intersection region acquired in the step 703 and AU is the area of the union region acquired in the step 703.

Figure 8:
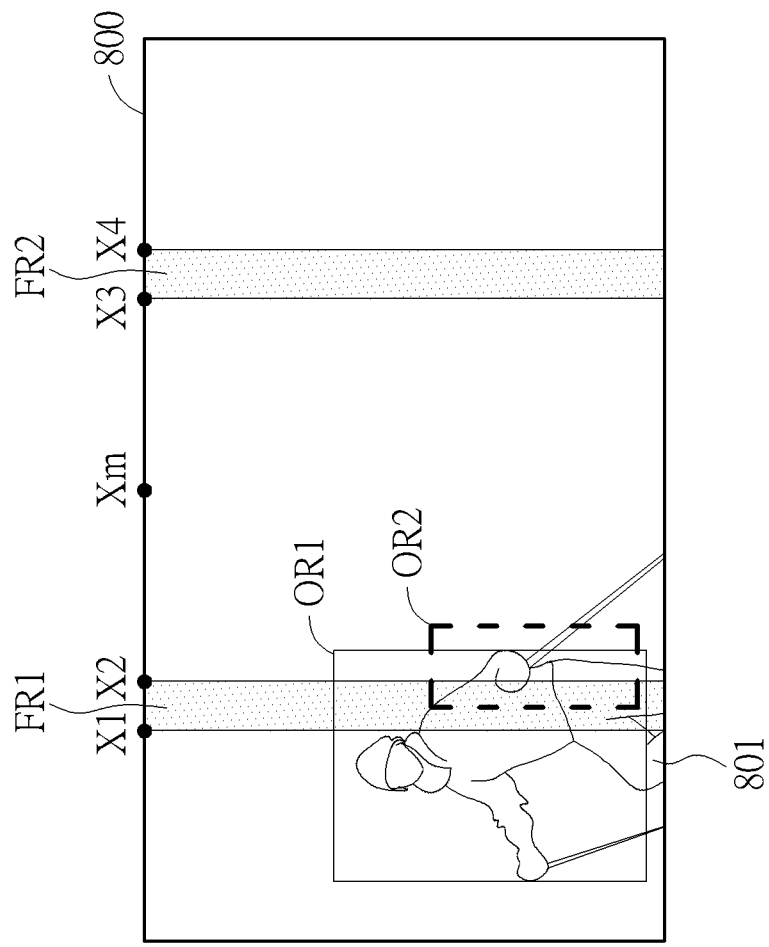
FIG. 8 is a schematic diagram illustrating an object detection method, according to another embodiment of the present invention.

Another method for removing unneeded object ranges is provided in following FIG. 8. Please note, the object ranges in FIG. 8 can be acquired by the object detection method illustrated in FIG. 2 but also can be acquired by any other method. Besides, the embodiment in FIG. 8 can be used after the image has been processed by the method illustrated in FIG. 5 and FIG. 6. However, the embodiment in FIG. 8 can also be used without using the method illustrated in FIG. 5 and FIG. 6.

As shown in FIG. 8, at least one filtering region FR1, FR2 (in this example, two filtering regions) are defined in an input image 800. Also, a plurality of object ranges corresponding to a target object image 801 are computed. After that, classifying the object range having an edge in the filter regions FR1, FR2 as a candidate object range, and classifying the object range having no edge in the filter region FR1, FR2 as a maintained object range. Therefore, in the embodiment of FIG. 8, the object range OR1 is a maintained object range and the object range OR2 is a candidate object range. Afterwards, remove the candidate object range from the object ranges, according to a relation between an area of an intersection region of the candidate object range and the maintained object range and an area of the candidate object range, or a relation between the area of the intersection region and the area of the maintained object range.

In one embodiment, the candidate object range is removed from the object ranges, if $$\frac{AI}{MA}$$

is larger than a second threshold value. The second threshold value can be the same as or different from the above-mentioned first threshold value. AI is the area of the intersection region of the candidate object range and the maintained object range, and MA is a minimum one of the areas of the candidate object range and the maintained object range.

The filtering ranges can be set corresponding to different requirements. In one embodiment, the filtering ranges comprise a first filtering region (e.g., the filter region FR1) and a second filtering region (e.g., the filter region FR2). As shown in FIG. 8, the first filtering region covers all vertical coordinates and X1 to X2 horizontal coordinates of the input image 800. Also, the second filtering region covers all of the vertical coordinates and X3 to X4 horizontal coordinates of the input image.

In the embodiment of FIG. 8, X4>X3>X2>X1. Also, Xm is a middle horizontal coordinate of the input image, X2 is smaller than Xm for a first value, and X3 is larger than Xm for a second value. The first value and the second value are identical. In other words, the difference between X2 and Xm and the difference between X3 and Xm are identical.

Figure 9:
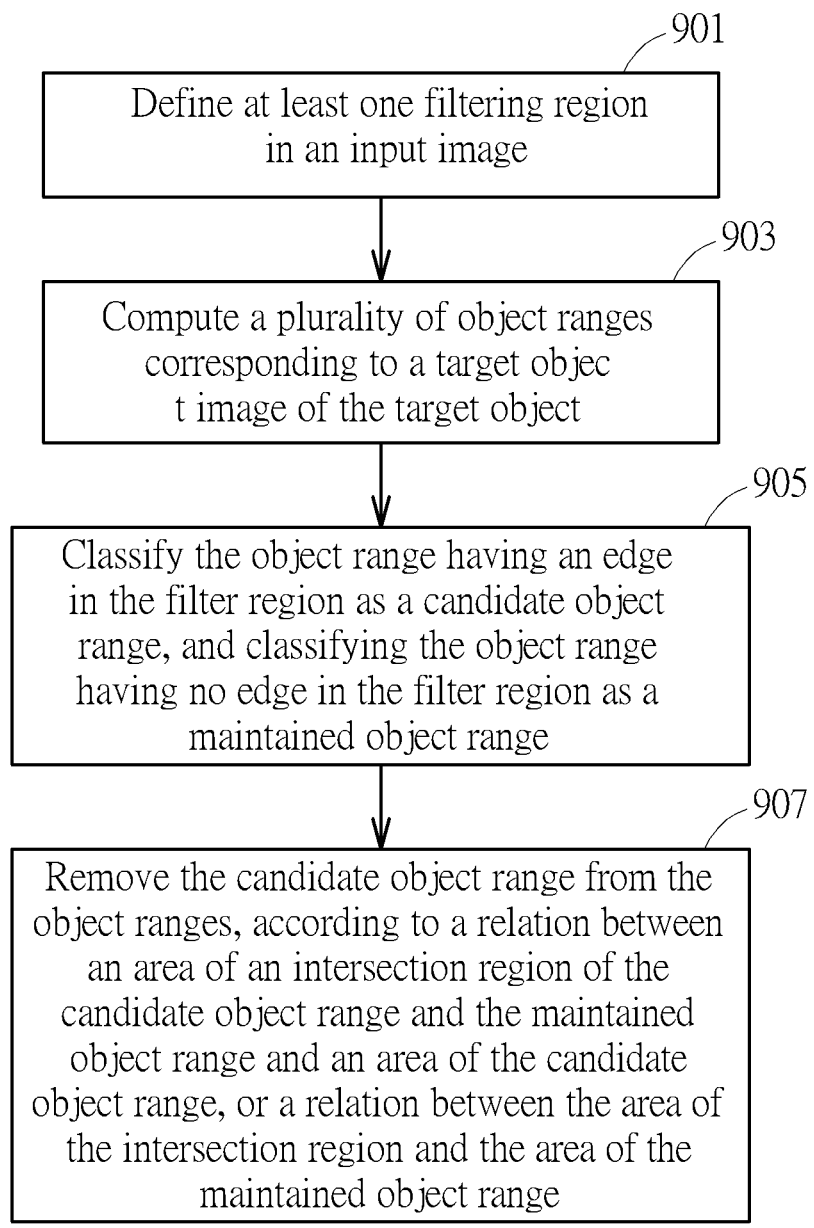
FIG. 9 is a flow chart illustrating a flow chart of the object detection method illustrated in FIG. 8.

The embodiment illustrated in FIG. 8 can be summarized as the steps illustrated in FIG. 9:

Step 901

Define at least one filtering region in an input image. The input image can be an image which is not processed yet, but can be an image which has been processed the method in FIG. 2 and/or the method illustrated in FIG. 5.

Step 903

Compute a plurality of object ranges corresponding to a target object image of the target object. Such object ranges can be generated by the object detection method illustrated in FIG. 2, but can be generated by any other method as well.

Step 905

Classify the object range having an edge in the filter region as a candidate object range, and classifying the object range having no edge in the filter region as a maintained object range.

For example, in the embodiment of FIG. 8, the object range OR1 is a maintained object range and the object range OR2 is a candidate object range.

Step 905

Remove the candidate object range from the object ranges, according to a relation between an area of an intersection region of the candidate object range and the maintained object range and an area of the candidate object range, or a relation between the area of the intersection region and the area of the maintained object range.

Other detail steps are illustrated in the embodiment of FIG. 8, thus are omitted for brevity here.

Figure 10:
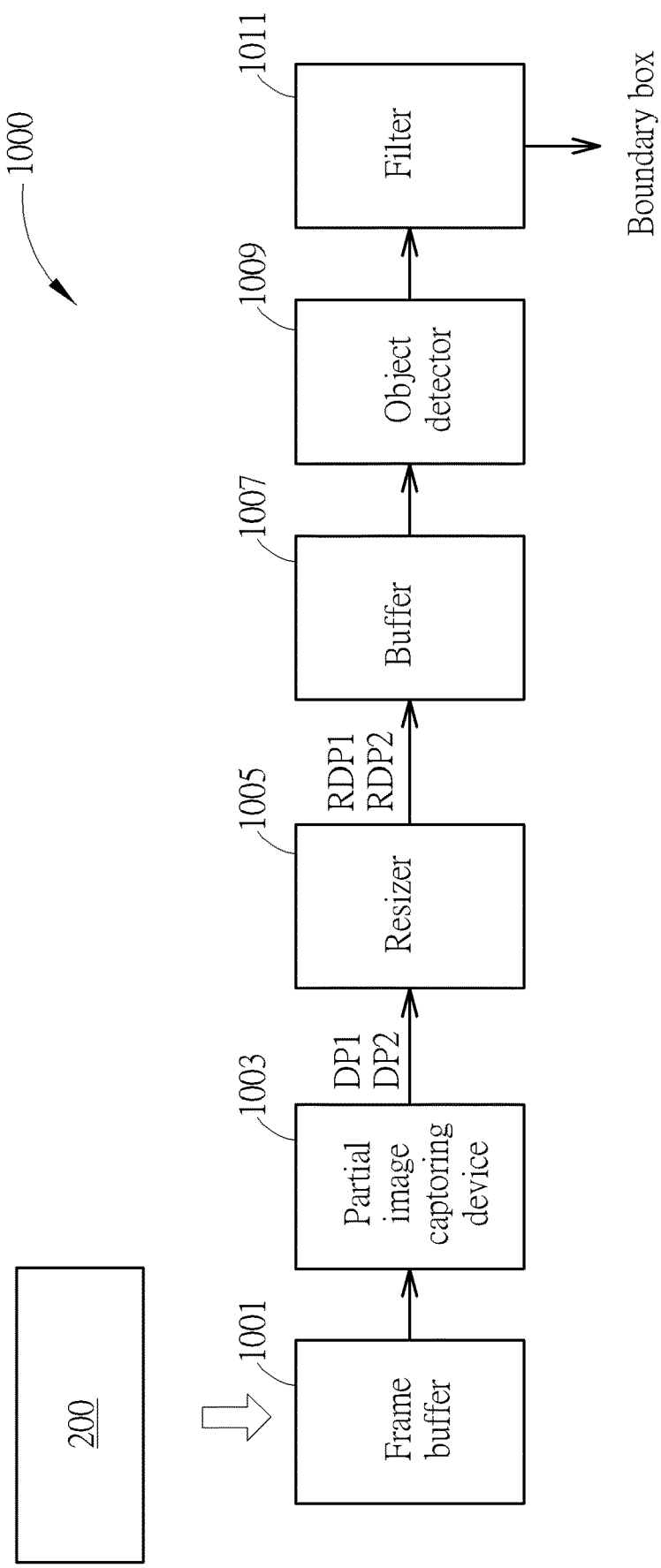
FIG. 10 is a block diagram illustrating an object detection system according to one embodiment of the present invention.

FIG. 10 is a block diagram illustrating an object detection system 1000 according to one embodiment of the present invention. Please note, the components illustrated in FIG. 10 are only examples for explaining and do not mean to limit the scope of the present invention. The object detection system 1000, which can be applied for performing the above-mentioned embodiments, comprises a frame buffer 1001, a partial image capturing device 1003, a resizer 1005, a buffer 1007, an object detector 1009 and a filter 1011.

The frame buffer 1001 is configured to buffer an input image such as the input image 200 shown in FIG. 2. Also, the partial image capturing device 1003 is configured to capture at least two detection portions with a first aspect ratio from the input image with a second aspect ratio. For example, the partial image capturing device 1003 is configured to capture the first detection portion DP1/the second detection portion DP2 illustrated in FIG. 2, which has an aspect ratio of 480/480 from the input image 200 with a different aspect ratio (640/480). Therefore, a size of a union of the detection portions can be equal to the input image, according to the embodiment illustrated in FIG. 2.

The object detector 1009 is configured to confirm whether any target object, such as person, is detected in each of the detection portions and to obtain corresponding boundary boxes for detected objects. In one embodiment, the object detector executes a CNN (Convolutional Neural Network) model to confirm and obtain the corresponding boundary boxes. The CNN model is a result of a known CNN training method, which trains the CNN model by a mass of images for detecting at least one kind of specific object, such as cars, person, dogs . . . etc.

In the embodiment of FIG. 10, the object detection system 1000 comprises the resizer 1005, which resizes the detection portions to generate the resized detection portions (e.g., the first resized detection portion RDP1 and the second resized detection portion RDP2 in FIG. 2). In such case, the object detector 1009 confirms whether any object is detected in each of the detection portions based on the resized detection portions. However, in another embodiment, the resizer 1005 is removed from the object detection system 1000 due to both the aspect ratio and size of the detection portion matches the input of the object detector 1009. In such case, confirms whether any object is detected in each of the detection portions based on the detection portions. The filter 1011 is configured to remove or to merge the boundary boxes, for example, by the methods illustrated in FIG. 5 or FIG. 8.

Besides the components illustrated in FIG. 10, in one embodiment, the object detection system 1000 further comprises a motion computing device (not illustrated) configured to perform the method illustrated in FIG. 4. Also, an object detection method can be acquired in view of the descriptions of FIG. 10, but the details thereof are omitted for brevity here.

In view of above-mentioned embodiments, the detection of persons can be more accurate without increasing a size of the buffer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection method, for detecting a target object, comprising:
   capturing at least two detection portions with a first aspect ratio from an input image with a second aspect ratio;
   confirming whether any object is detected in each of the detection portions and obtaining corresponding boundary boxes for detected objects; and
   removing or merging the boundary boxes, comprising:
      defining at least one filtering region in the input image;

classifying the boundary box having an edge in the filter region as a candidate boundary box, and classifying the boundary box having no edge in the filter region as a maintained boundary box; and removing the candidate boundary box from the boundary boxes if $$\frac{AI}{MA}$$

is larger than a threshold value, wherein AI is the area of an intersection region of the candidate boundary box or the maintained boundary box, and MA is a minimum one of the areas of the candidate boundary box and the maintained boundary box;

wherein the first aspect ratio is different to the second aspect ratio.

2. The object detection method of claim 1, resizing the detection portions for detection of the object.

3. The object detection method of claim 1, wherein a CNN model is executed to confirm and obtain the corresponding boundary boxes.

4. The object detection method of claim 1, wherein a size of a union of the detection portions is equal to the input image.

5. The object detection method of claim 1, wherein at least part of detection portions is identical.

6. The object detection method of claim 1, further comprising:

providing a ROI (region of interest), and computing motions of the target object in the ROI;

wherein the ROI is adjusted based on the boundary boxes when the ROI is larger than a ROI threshold area, and not adjusted based on the boundary boxes when the ROI is smaller than the ROI threshold area.

7. The object detection method of claim 1, wherein the filtering ranges comprises a first filtering region and a second filtering region, wherein the first filtering region covers all vertical coordinates and X1 to X2 horizontal coordinates of the input image, wherein the second filtering region covers all of the vertical coordinates and X3 to X4 horizontal coordinates of the input image, X4>X3>X2>X1.

8. An object detection system, for detecting a target object, comprising:

a partial image capturing device, configured to capture at least two detection portions with a first aspect ratio from an input image with a second aspect ratio;

an object detector, configured to receiving the at least two detection portions with the first aspect ratio and then confirm whether any object is detected in each of the detection portions and to obtain corresponding boundary boxes for detected objects; and a filter, configured to remove or to merge the boundary boxes, by:

defining at least one filtering region in the input image;

classifying the boundary box having an edge in the filter region as a candidate boundary box, and classifying the boundary box having no edge in the filter region as a maintained boundary box; and removing the candidate boundary box from the boundary boxes if $$\frac{AI}{MA}$$

is larger than a threshold value, wherein AI is the area of an intersection region of the candidate boundary box or the maintained boundary box, and MA is a minimum one of the areas of the candidate boundary box and the maintained boundary box;

wherein the first aspect ratio is different to the second aspect ratio.

9. The object detection system of claim 8, wherein the detection portions are resized for the object detector to confirm whether the object is detected in each of the detection portions.

10. The object detection system of claim 8, wherein the object detector executes a CNN model to confirm and obtain the corresponding boundary boxes.

11. The object detection system of claim 10, wherein a size of a union of the detection portions is equal to the input image.

12. The object detection system of claim 10, wherein at least part of the detection portions is identical.

13. The object detection system of claim 8, further comprising:

a motion computing device, configured to provide a ROI (region of interest), and to compute motions of the target object in the ROI;

wherein the motion computing device adjusts the ROI based on the boundary boxes when the ROI is larger than a ROI threshold area, and not adjusting the ROI based on the boundary boxes when the ROI is smaller than the ROI threshold area.

14. The object detection system of claim 8, wherein the filtering ranges comprises a first filtering region and a second filtering region, wherein the first filtering region covers all vertical coordinates and X1 to X2 horizontal coordinates of the input image, wherein the second filtering region covers all of the vertical coordinates and X3 to X4 horizontal coordinates of the input image, X4>X3>X2>X1.

* * * * *